May 22, 1945.　　　R. C. LASSIAT　　　2,376,365
APPARATUS FOR EFFECTING CONTACTING REACTIONS
Filed March 26, 1942　　3 Sheets-Sheet 1

INVENTOR
RAYMOND C. LASSIAT
BY
Ira L. Nickerson
ATTORNEY

May 22, 1945.   R. C. LASSIAT   2,376,365
APPARATUS FOR EFFECTING CONTACTING REACTIONS
Filed March 26, 1942   3 Sheets-Sheet 3

INVENTOR
RAYMOND C. LASSIAT
BY
Ira L. Nickerson
ATTORNEY

Patented May 22, 1945

2,376,365

UNITED STATES PATENT OFFICE 2,376,365

APPARATUS FOR EFFECTING CONTACTING REACTIONS

Raymond C. Lassiat, Media, Pa., assignor to Houdry Process Corporation, Wilmington, Del., a corporation of Delaware Application March 26, 1942, Serial No. 436,252

2 Claims. (Cl. 23—288)

This invention relates to contacting operations and is concerned particularly with method and apparatus which provide for the simultaneous movement of fluid reactants and solid contact material through a reaction zone It is well known, and particularly in the hydrocarbon art, that contact material which is used in a reaction for obtaining a desired product from a starting fluid material becomes contaminated with a carbonaceous deposit causing a reduction in the activity or ability of the contact material to effect the desired reaction and after a period of use it is necessary to remove the deposit from the material before again putting it to productive use. The deposit is ordinarily removed by supplying air or other oxygen-containing medium to the contact material at a sufficiently high temperature to cause a burning of the carbon and effect the regeneration of the contact material. During the burning of the carbon or the regeneration period of operation, heat is evolved and in order to prevent injury to the contact material it is necessary to control the temperature of the same by extracting therefrom a portion or all of the evolved heat and during the productive use of the contact material, for example, when it is used in an on-stream hydrocarbon cracking reaction the contact material must also be maintained at a proper temperature to supply heat for the reaction. It is therefore apparent that provision must be made for accurate and close temperature control of the contact material.

The present invention is concerned with the continuous supply of active contact material to a reaction zone for the onstream reaction and the continuous removal of the contaminated contact material from the on-stream zone to a regeneration zone where it is conditioned or regenerated and made ready for later on-stream use. One object of the invention is to provide on-stream and regeneration reaction chambers which cooperate mutually in the contact treatment of fluids. Another object is to construct complemental on-stream and regeneration chambers as a unitary structure. Another object is to construct the reaction chambers in a manner to provide for controlling the direction of flow and the length of path of the reactants through the contact material. Another object is to provide a novel arrangement for forming fluid zones and contact material zones within the reaction chamber. Another object is to provide for fluid communication between the zones while confining the contact material to its zone or zones during movement of the contact material through the reaction chamber. Another object is to provide accurate temperature conditions for the contact material in both reaction chambers. Another object is to provide temperature control apparatus which is designed specifically for use with powdered or granular material.

In practicing the invention the casings forming the on-stream and regeneration reaction chambers will be superposed, preferably with the casing forming the regeneration chamber disposed at the top and in communication at its lower end with the on-stream casing in a manner to form a unitary structure. Fresh contact material will be supplied to the unit through a suitable opening at or near the top of the regeneration casing and as the material becomes contaminated during the on-stream reaction it will pass by gravity through the bottom of the on-stream or lower casing and be carried upwardly by desired elevating means to be supplied to the upper casing for the regeneration operation. The rate of movement of the material through the unit will be controlled by suitable means at the outlet end of the on-stream casing. The general arrangement of the contacting unit is suitable for use with contact material formed into small pellets, for example, such as that disclosed in Patent No. 2,078,945, issued to E. J. Houdry on May 4, 1937, as well as with finely divided or powdered material. Suitable sets of manifolds are provided each casing for supplying the on-stream reactants to the lower casing and removal of reaction products therefrom and for supplying the regeneration reactants to the upper casing and for removing regeneration products therefrom. Also in order to provide a commercially practical apparatus sets of manifolds are provided for supplying a purging fluid such as steam or other inert fluid to the material and other sets of manifolds are provided for removing the purge products therefrom before the material undergoes either the regeneration or the on-stream reaction. These last mentioned sets of manifolds may all be associated with either the upper or lower casing, or one set of inlet purge fluid and one set of outlet purge products manifolds, may be associated with each casing.

A temperature control system is provided, at least, for the regeneration casing, since it is essential during this burning or exothermic period to prevent the contact material from becoming overheated and causing injury to the material and, depending on the type of onstream reaction in the lower casing, it may at times be necessary or desirable to provide for temperature control in this portion of the unit. When the on-stream reaction in the lower casing is endothermic, for example, one involving a hydrocarbon cracking reaction at a temperature below that obtaining in the regeneration casing independent temperature control means may be provided between the upper and lower casings in order to remove the desired amount of heat and bring the temperature of the material down to that desired for the on-stream reaction before the contact material enters the on-stream zone.

When a moving body of contact material is used in contacting operations it is recognized that best results are obtained if the fluid reactants pass therethrough in countercurrent flow since this manner of operation permits the least active material to contact the fresh or least refractory reactants being supplied to one end of the reaction chamber, while the most refractory reactants will contact the most active material as it is supplied to the other end of the reaction chamber which provides a generally uniform reaction through the chamber. Accordingly, the casings making up the unit are designed to provide reaction chambers which permit this type of flow and in addition provide for horizontal or cross flow through the moving contact material. To this end partitioning means extend vertically across the casings to divide the reaction chambers into a plurality of aligned vertical compartments. Baffle means are provided above the partitions and adjacent the top of alternate of the compartments in order to prevent the entry of contact material into these compartments and to form reaction fluid zones. The compartments adjacent those forming the reaction fluid zones are open at the top and as the mass of contact material is supplied to the top of the reaction chamber it will pass into these compartments and form contact material zones. The partitioning means are designed to permit the passage of fluid from the reaction fluid zones into the adjacent contact material zones but in addition are also designed to prevent the contact material which is being used in the apparatus from passing from the contact material zones into the reaction fluid zones. The various reaction fluids used in the process are supplied to the fluid zones adjacent their lower ends and the products of reaction collected at points adjacent their upper ends providing for countercurrent flow with the falling contact material. In order to provide a cross flow of the reactants through the moving contact material, deflecting or baffling means are provided in the fluid zones above fluid supply inlet manifolds and as the reactants are supplied they will pass upwardly to the deflecting means and be directed transversely through a desired section of the streams of contact material. Due to the reaction fluid and contact material zones being aligned, the supply manifolds may be arranged only in alternate of the fluid zones and the fluid from each zone will be deflected transversely through two adjacent contact material zones. Other deflecting means may also be arranged in the remaining fluid zones at a point above the baffles in the inlet fluid zones and the fluid deflected back and forth through different sections of the catalyst zones. The products of reaction may be collected adjacent the top of any of the fluid zones.

For a complete understanding of the invention reference may be had to the accompanying drawings, in which Fig. 1 is an elevational and somewhat diagrammatic view of a complete unit adapted for a moving body of contact material and includes on-stream and regeneration reaction chambers with associated apparatus;

Figure 1:
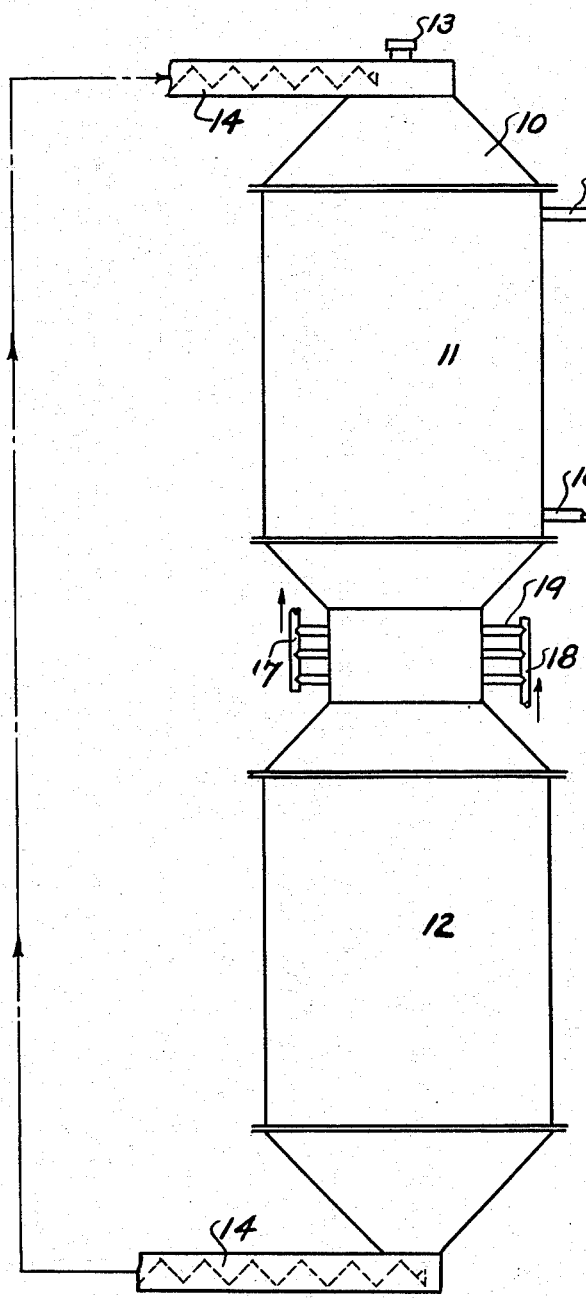

Referring to Fig. 1, the catalyst unit is indicated generally at 10 and comprises an upper reaction casing 11 and lower reaction casing 12. The contact material or catalyst used in the operation is admitted to the top of the unit through opening 13 and passes from the upper casing to the lower casing from which casing it is removed and conveyed by an elevator 14 back to the upper casing 11 for recirculation. The rate of flow of the material is controlled by suitable valves, not indicated, positioned at the lower end of casing 12. Either the upper or lower casing of the unit may be used for the on-stream reaction and the other casing for the regeneration reaction. In Fig 1 it will be assumed that the upper casing 11 is used for regeneration of the contact material after it has become contaminated in passing through the lower on-stream casing and the upper casing as shown is provided with temperature control apparatus comprising sets of upper and lower heat exchange fluid manifolds 15 and 16, respectively, extending into the casing and interconnected by a plurality of tubes, to be later described in detail, through which a heat exchange medium, such as fused salts, mercury, diphenyl or a gaseous medium, such as steam, is circulated by pumping means P in heat exchange relation with the contact material. It is usually necessary to provide the heat exchange apparatus in the regeneration chamber in order to prevent the temperature of the contact material from reaching a point which might injure the material. For some reactions it may be necessary to provide the lower casing with suitable heat exchange apparatus to extract or add heat, as the reaction therein requires. During the passage of the contact material through the upper casing the temperature of the material may be very accurately controlled and even to such an extent that as the material enters the lower casing it will be at the temperature required to begin or effect the on-stream reaction. However, in order to insure the proper temperature of the material entering the lower casing a supplemental heat exchange system comprising manifolds 17 and 18 interconnected by tubes 19, may be provided between the casings as indicated.

Figure 2:
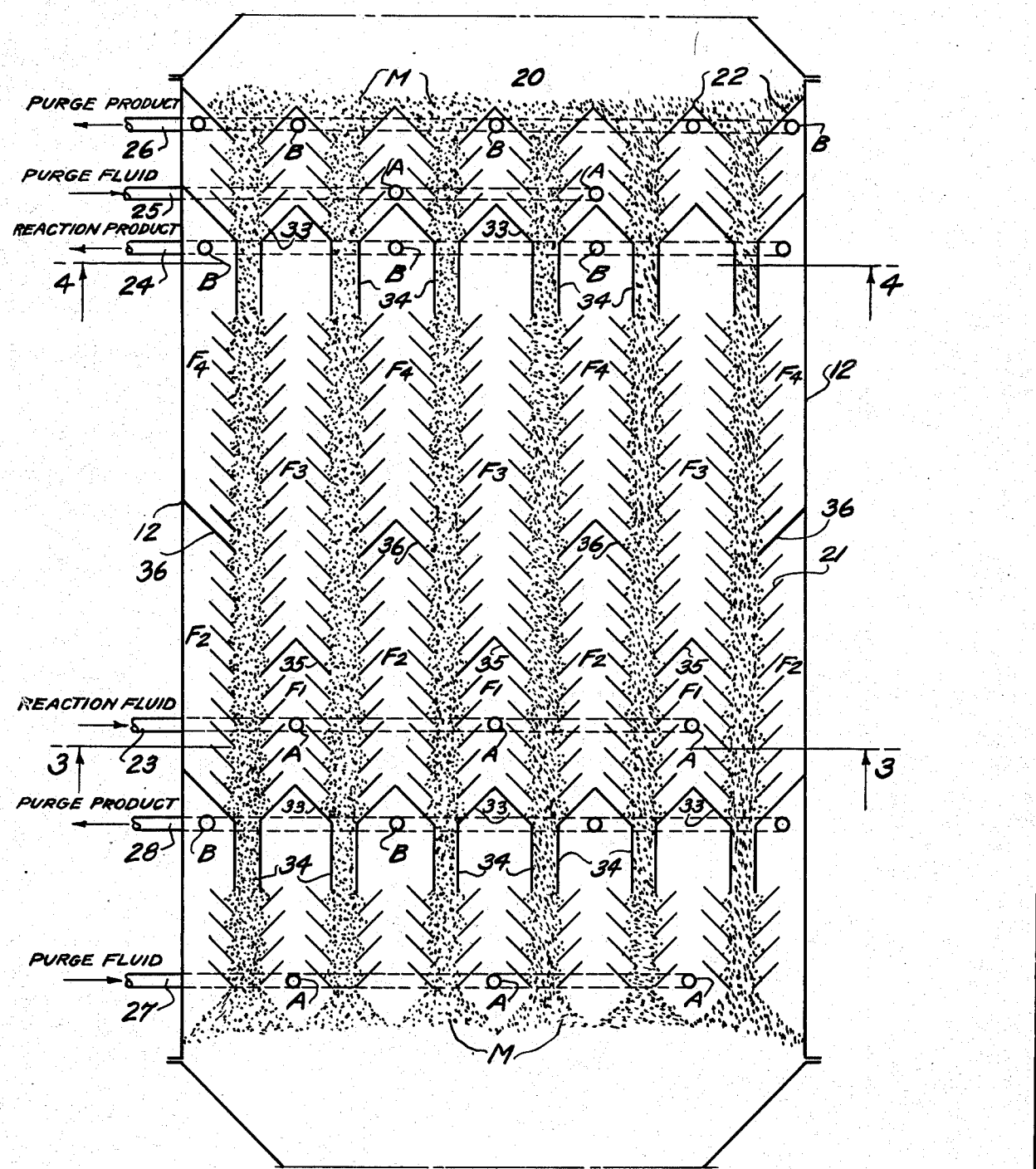
Fig. 2 is an elevational view of one of the reaction chambers of the unit with an outer wall removed to show details of the interior construction.

Referring to Fig. 2 for details of construction of one of the reaction chambers formed, for example, by the casing 12 of Fig. 1, the chamber 20 is divided by a plurality of spaced vertically extending partitioning means into a plurality of compartments which extend transversely across the chamber. In the particular embodiment shown, the chamber is designed particularly for a powdered or granular contact material and the particular partitioning means used for this type of contact material comprises a plurality of rows of plates 21 which extend transversely across the reaction chamber to be secured to the side walls thereof. The plates of each row are disposed in spaced angular relation and the plates of adjacent rows are inclined in opposite directions, providing a plurality of compartments across the chambers, some of which are defined by the lower edges of the plates 21 while the compartments adjacent these are defined by the upper edges of the plates. The plates 21 will be disposed at an angle which is greater than the natural angle of repose of the contact material in order to insure its unimpeded flow through the zones M for preventing it from accumulating about the lower edges of the plates which would occur if the plates were disposed at an angle less than the angle of repose of the material. The compartments formed by the lower edges of the plates are used for the streams of contact material M and these formed by the upper edges are used for reaction fluid F. To this end baffling or deflecting means 22 are positioned across the top portion of chamber 20 and over the compartments F, and as the contact material falls downwardly through the chamber 20 the baffles 22 prevent the contact material from entering the compartments F and provide zones for fluid but the contact material is directed into the adjacent compartments M which provide the contact material zones. The particular form of partitioning means described above is adapted for powdered or finely divided contact material, since the transverse plates making up the partitions may be disposed at such an angle and so spaced as to prevent the contact material during its passage through the compartments M from entering the fluid zones F and at the same time permit the fluid from zones F to flow freely into the contact material zones M. When a contact material comprising pellets or large granular pieces is used, it is within the scope of the invention to form the partitioning plates of flat walls having apertures therein which are sufficiently small to prevent the entry of the contact material into the adjacent fluid zones, but at the same time permit the passage of fluid from fluid zones into the contact material zones. The particular reaction chamber 20 is made up of a central zone extending horizontally across the chamber which is provided with and defined by a set of reaction fluid inlet manifolds 23 for supplying the reactants, and a set of reaction product outlet manifolds 24 for the removal of reaction products. Above the central reaction chamber is a purging zone provided with and defined by a set of purge fluid inlet manifolds 25 for supplying purging material, such as steam or other inert fluid, and a set of purge product outlet manifolds 26 through which the purged products are removed after the regeneration operation. Below the reaction chamber 20 are another purging zone, provided with and defined by a set of inlet manifolds 27 for admitting purging material, and a set of purge product outlet manifolds 28 for the removal of purge products after the on-stream operation. As shown in Fig. 2, the inlet manifolding means for the purging fluid and the reaction fluid are conveniently arranged to have the inlet nozzles A disposed within alternate of the fluid zones F and the outlet manifolds for the purge and reaction products are arranged to have their outlet nozzles B disposed in the remaining or outlet fluid zones. It will be appreciated, however, as the description proceeds, that the fluid inlets and outlets can both be disposed in the same fluid zones, if desired.

Figure 4:
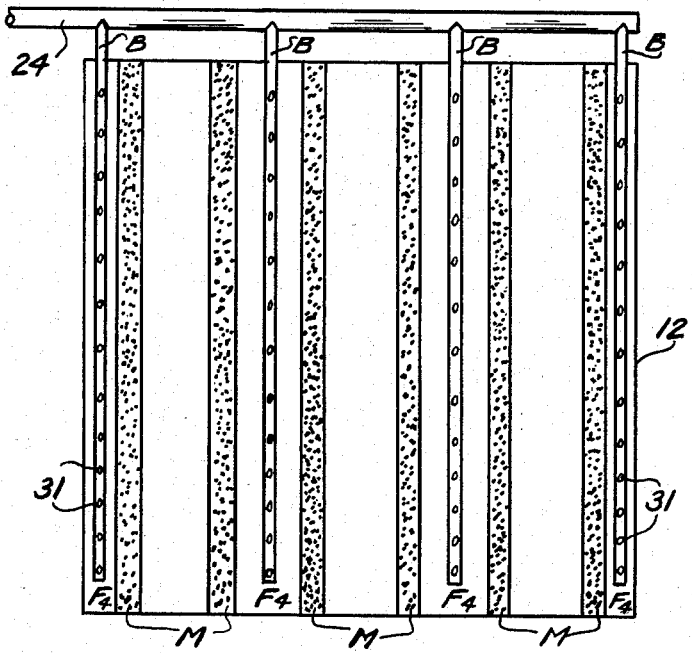
Fig. 4 is a similar view taken on the line 4—4 of Fig. 2.
Figure 3:
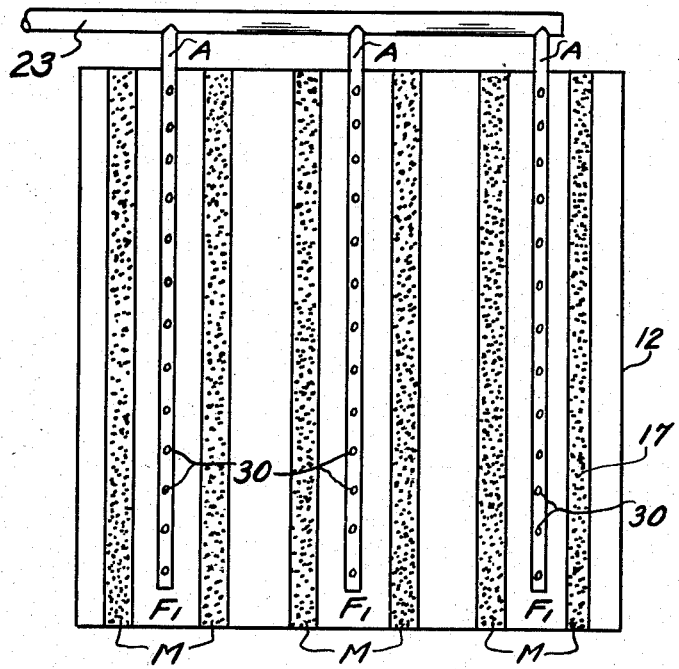
Fig. 3 is a horizontal sectional view taken on the line 3—3 of Fig. 2 and reduced in size.

In Figs. 3 and 4 the general relationship of the fluid manifolds with the various fluid zones and contact material zones is shown. These views are taken to show only the reaction fluid supply and reaction product removal means but it is to be understood that the purge fluid supply and purge product removal means may be of similar design. In Fig. 3, 23 indicates the reaction fluid manifold and A the fluid inlet supply tubes which are provided with apertures 30 and disposed in certain of the fluid zones F for supplying fluid to adjacent zones of contact material M. In Fig. 4 the reaction product manifold 24 is provided with outlet tubes B which are apertured at 31 and disposed in the remaining fluid zones F for receiving reaction products from the adjacent zones of contact material M. Although the casing 12 in these figures is rectangular in shape, it will, of course, be understood that this design is exemplary only and that the invention is applicable to casings or converters of various other shapes.

Referring again to Fig. 2 the reaction fluid and purging fluid inlets A are positioned adjacent the bottom of the respective reaction and purging fluid zones for passage upwardly of the fluid and the upper limits of the zones are defined by a plurality of inverted channel shaped members 33 which function, in effect, to separate the zones by limiting the upward passage of the fluid in each zone and to deflect the fluids transversely from the fluid inlets A across the streams of contact material and into the remaining zones. The members 33 are additionally provided with depending skirt portions 34 which tend to prevent intermingling of fluid supplied to one zone with the fluid products of the zone therebelow. In the case of the upper purging zone the baffles 22 heretofore referred to will function to limit the upward movement of the purging fluid in this zone and deflect the fluid transversely from the inlet zones F through the streams of contact material.

The central reaction fluid zone is additionally provided with a plurality of deflecting plates which may conveniently take the form of inverted channel members or angularly disposed plates. These plates are positioned in both the inlet fluid zones and the outlet fluid zones and function to direct the fluid from the inlet zone across the contact material into the outlet zone and then to direct the fluid from the outlet zone back across the material into the inlet fluid zone. The plates in the inlet fluid zones are disposed at different levels from those in the outlet fluid zones in order that the fluid will traverse the streams of contact material at gradually higher levels so that as the fluid becomes more refractory in its upward passage through the reaction chamber it will traverse layers of contact material toward the top of the chamber having gradually higher activity and the products of reaction will be collected in the outlets B and withdrawn through manifold 24.

The deflecting plates will be positioned in horizontal rows at substantially the same level in the inlet fluid zones and the rows in the outlet fluid zones will be positioned at substantially the same level but above the level of the deflector plates in the inlet fluid zones. Any number of rows of deflectors in each set of fluid zones may be used and will depend on the height of the chamber and the number of transverse passes of the fluid through the streams of contact material it is desired to have. From a further inspection of Fig.

2, for example, it will be seen that one row of deflectors 35 is provided above the inlets A for directing the fluid transversely in either direction through the adjacent streams of contact material from sections $F_1$ of the inlet fluid zones into sections $F_2$ formed by deflecting plates 36 disposed in the remaining fluid zones. From the sections $F_2$ the fluid is then directed back through the streams of contact material into sections $F_3$ of the inlet fluid zones and then again deflected through the streams of contact material into upper sections $F_4$ of the outlet fluid zones where the products of reaction are removed through outlets B of manifolds 24. This arrangement of the deflectors in the reaction fluid zone provides a cross flow of reactants through the downwardly falling contact material and additionally provides, in effect, a countercurrent flow of the fluid upwardly of the contact material zones, which is desirable since the countercurrent flow of reactants with the contact material is essential to an even and regulated method of operation.

The distance between deflector plates will be set to provide an optimum velocity of the reactants through the bed of moving contact material while limiting the velocity in order to prevent entrainment of the contact material by the vapor stream. For a reaction, for example a hydrocarbon cracking reaction, the volume of vapors increases as the reactants progress upwardly from one section to another and the distance between deflecting plates may be progressively increased from the bottom of the chamber toward the top. The arrangement of partition plates will be such, however, that should contact material be entrained by the vapor stream between partition plates 21, the larger particles entrained will fall by gravity to the bottom of respective vapor spaces, but due to the particular angle at which the plates are set, the particles will be picked up again by the stream of moving contact material. The fine particles remaining in suspension will be carried to the upper part of the contact material bed and also reincorporated therein. In all cases the upper fluid sections indicated by $F_4$ in Fig. 2 are made substantially longer than the others in order to provide minimum velocity of reactants toward the top of the chamber and final separation from the vapor stream of any entrained contact material.

The skirt portions 34 on plates 33 provide for beds of contact material therebetween which offer great resistance to the flow of fluids and prevents purge material from passing through the beds of contact material from the upper and lower purging zones to the reaction zone and they also provide, in effect, adjacent vapor chambers about the outlets B for reaction products and purge products, wherein the velocity is reduced which permits settling of contact material which might be entrained adjacent the top of the chamber. In operation, the purging zones must be maintained at a pressure slightly higher than the reaction chamber, permitting a small amount of the purging fluid to be carried through the contact material between skirt portions 34 in order to block the reaction fluid and prevent its admission to the purging zones.

Although the casing 12 of Fig. 2 has been described as containing end purging zones with the reaction zones therebetween, it is to be understood that this is not limitative but only exemplary of the invention. The upper purging zone is for removing from the contact material any reaction products which remain therein from a prior reaction before the contact material is used in a later reaction in casing 12 and the lower purging zone is for removing any reaction products remaining in the material after the reaction in casing 12. For example, if the lower casing 12 of Fig. 1 is considered to be constructed similarly to that described in Fig. 2, then the upper casing 11 of Fig. 1 would not contain any purging zones but only a reaction zone, since the purging zones of the lower casing 12 would be so positioned relative to both reaction chambers that the contact material could be purged after each reaction as is necessary for proper commercial operation. Also it is within the scope of the invention to provide each casing 11 and 12 with one purging chamber properly positioned in the combined unit to effect a purging of the contact material after each reaction.

Figure 5:
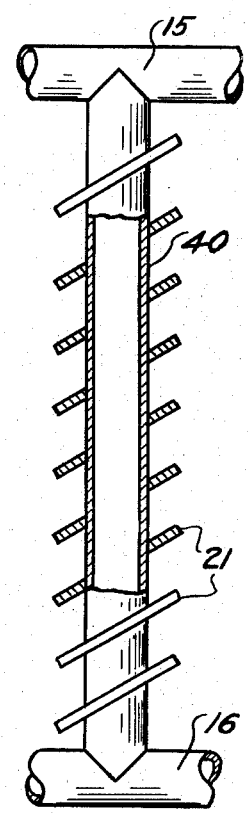
Fig. 5 is an enlarged view partly in section showing a detail of the invention.

Referring to Fig. 5 for a description of a detail of the invention which relates to the heat exchange system shown diagrammatically in connection with the upper casing 11 of Fig. 1, the casing 11 may contain a series of tubes 40 which interconnect the manifolds 15 and 16 and are in communication therewith. The plates 21, forming the partitions which divide the reaction chamber into contact material zones and fluid zones, are apertured at spaced intervals along their length to receive a series of these tubes in tightly fitting engagement in order to provide for good heat conductivity. The lower edges of the plate 21 will function as fins for conducting heat to or from the stream of contact material during its passage downwardly through the casing and the temperature of the contact material regulated as desired.

In operation, the unit shown in Fig. 1 may be considered to be used in a hydrocarbon cracking operation to produce material in the gasoline boiling range and the on-stream operation to be carried out in the lower casing 12. As the contact material moves through this portion of the unit in contact with the hydrocarbon reactants it becomes contaminated with a deposit of carbon or coky material which, after leaving the casing 12, is removed to the casing 11 to be regenerated. The temperature of the contact material in lower casing 12 will be within the range of 750 to 900° F. for this particular reaction but the temperature of the material undergoing regeneration in the upper casing 11 will be higher and must be controlled to maintain it by preference below about 1050° F. in order to prevent injury to the contact material. Preferably the temperature of the material in casing 11 will be so controlled that as the material leaves this casing to enter casing 12 for the on-stream operation it will be at around or below 900°, as may be suitable for starting the on-stream reaction. In order to control the temperature of the material to such a close degree that it is proper for the on-stream reaction, the supplemental heat exchange system in the middle of the unit may be utilized, if desired.

I claim as my invention:

1. Apparatus for carrying out contacting operations which comprises a casing providing a chamber, an inlet at the top for admitting contact material and an outlet at the bottom for removing contact material, a plurality of spaced vertical rows of elongate plates extending across the casing with plates of each row being angularly disposed in the same direction providing inwardly extending lower edges and outwardly extending upper edges and plates of adjacent rows sloping in opposite directions forming vertical spaces between the upper edges of adjacent rows and other vertical spaces between the lower edges of adjacent rows, blocking means above the first mentioned vertical spaces for preventing contact material from entering said first mentioned vertical spaces and forming thereof fluid zones, the second mentioned vertical spaces receiving contact material as it is admitted and forming contact material zones, baffling means within each fluid zone and extending horizontally across the chamber dividing the chamber into at least two compartments, separate fluid distributing means in at least one of the fluid zones above and below its baffling means, cooperating fluid collecting means positioned in an adjacent fluid zone above and below said baffling means, each of said collecting means being positioned in a plane above its cooperating fluid distributing means, and each of said baffling means having depending skirts thereon to prevent intermingling of fluid in one compartment with fluid in another compartment.

2. Apparatus for carrying out contacting operations which comprises a casing providing a chamber, an inlet at the top for admitting contact material and an outlet at the bottom for removing contact material, a plurality of spaced vertical rows of elongate plates extending across the casing with plates of each row being angularly disposed in the same direction providing inwardly extending lower edges and outwardly extending upper edges and plates of adjacent rows sloping in opposite directions forming vertical spaces between the upper edges of adjacent rows and other vertical spaces between the lower edges of adjacent rows, blocking means above the first mentioned vertical spaces for preventing contact material from entering said first mentioned vertical spaces and forming thereof fluid zones, the second mentioned vertical spaces receiving contact material as it is admitted and forming contact material zones, baffling means within each fluid zone and extending horizontally across the chamber dividing the chamber into at least two compartments, separate fluid distributing means in at least one of the fluid zones above and below said baffling means, cooperating fluid collecting means positioned in an adjacent fluid zone above and below said baffling means, each of said collecting means being positioned in a plane above its cooperating fluid distributing means, each of said baffling means having depending skirts thereon to prevent intermingling of fluid in one compartment with fluid in another compartment and deflecting means at different levels in at least two adjacent fluid zones for directing fluid across the contact material zone therebetween.

RAYMOND C. LASSIAT.